United States Patent [19]

Lenney et al.

[11] Patent Number: 4,921,898
[45] Date of Patent: May 1, 1990

[54] VINYL ACETATE-ETHYLENE COPOLYMER EMULSIONS PREPARED IN THE PRESENCE OF A STABILIZING SYSTEM OF A LOW MOLECULAR WEIGHT POLYVINYL ALCOHOL AND A SURFACTANT

[75] Inventors: William E. Lenney; John G. Iacoviello, both of Allentown, Pa.

[73] Assignee: Air Products and Chemicals, Inc., Allentown, Pa.

[21] Appl. No.: 15,194

[22] Filed: Feb. 17, 1987

Related U.S. Application Data

[63] Continuation of Ser. No. 762,096, Aug. 2, 1985, abandoned.

[51] Int. Cl.$^5$ ................................. C08F 2/16
[52] U.S. Cl. ........................... 524/459; 524/503; 526/202
[58] Field of Search ............... 524/459, 503; 526/202

[56] References Cited

U.S. PATENT DOCUMENTS

| | | | |
|---|---|---|---|
| 3,530,080 | 9/1970 | Inskip | 524/503 |
| 3,532,658 | 10/1970 | Gintz | 524/459 |
| 3,661,696 | 5/1972 | Knutson | 161/204 |
| 3,692,723 | 9/1972 | Kasagi et al. | 260/29.6 E |
| 3,714,105 | 1/1973 | Stehle et al. | 524/459 |
| 3,734,819 | 5/1973 | Knutson | 161/254 |
| 3,769,151 | 10/1973 | Knutson et al. | 161/204 |
| 3,816,362 | 6/1974 | Tsuchihara et al. | 260/17 A |
| 3,827,996 | 8/1974 | Beresniewicz | 260/29.6 WB |
| 3,830,761 | 8/1974 | Lenney | 524/459 |
| 3,844,990 | 10/1974 | Lindemann | 526/202 |
| 4,043,961 | 8/1977 | Beresniewicz et al. | 524/459 |
| 4,128,518 | 12/1978 | Oyamada et al. | 524/503 |
| 4,133,791 | 1/1971 | Kemenater et al. | 524/459 |
| 4,189,415 | 2/1980 | Eck et al. | 524/503 |
| 4,239,563 | 12/1980 | Iacoviello | 156/72 |
| 4,267,090 | 5/1981 | Heimberg et al. | 524/503 |
| 4,287,329 | 9/1981 | Heimberg | 524/459 |
| 4,332,850 | 6/1982 | Iacoviello | 428/288 |
| 4,521,561 | 6/1985 | Hausman et al. | 524/459 |
| 4,528,315 | 7/1985 | Eck et al. | 526/202 |

FOREIGN PATENT DOCUMENTS

| | | | |
|---|---|---|---|
| 57-85871 | 5/1982 | Japan | . |
| 0120680 | 7/1983 | Japan | 524/549 |

Primary Examiner—Joseph L. Schofer
Assistant Examiner—J. M. Reddick
Attorney, Agent, or Firm—Michael Leach; James C. Simmons; William F. Marsh

[57] ABSTRACT

A vinyl acetate-ethylene copolymer emulsion which is about 65–70% solids and has a viscosity of less than about 3,500 is disclosed. The emulsion is prepared by copolymerization of vinyl acetate and ethylene monomers in the presence of a stabilizing system consisting essentially of 2–4 wt %, based on vinyl acetate monomer, of a polyvinyl alcohol having a 100–600 degree of polymerization and 2–4wt %, based on vinyl acetate monomer, of a surfactant. Such emulsions demonstrate an improved speed of set as an adhesive.

28 Claims, No Drawings

VINYL ACETATE-ETHYLENE COPOLYMER EMULSIONS PREPARED IN THE PRESENCE OF A STABILIZING SYSTEM OF A LOW MOLECULAR WEIGHT POLYVINYL ALCOHOL AND A SURFACTANT

This is a continuation of application Ser. No. 762,096 filed on Aug. 2, 1985, now abandoned.

TECHNICAL FIELD

The invention relates to vinyl acetate-ethylene copolymer emulsions and, more particularly, relates to such copolymer emulsions prepared in the presence of a polyvinyl alcohol stabilizing agent to provide an adhesive composition.

BACKGROUND OF THE INVENTION

A large proportion of packaging adhesives currently in use in the United States and Europe are based on hot melt compositions. Since these adhesives are applied at elevated temperatures, considerable amounts of energy are required to maintain suitable application temperatures. A primary performance parameter is the adhesive's ability to set a bond rapidly and to maintain this bond after a short application of pressure.

As energy costs continue to rise the need increases to replace hot melts with cold or room temperature setting adhesives. By improving, i.e. accelerating, the emulsion setting speed it would be possible to substitute or use water based adhesives in place of the more energy intensive hot melt products.

One method of enhancing adhesive performance parameters such as speed of set, PVC peel strength, water resistance, smoothness (less wood grain raising) and other properties would be to increase the emulsion solids content. In other words, reducing the continuous phase volume or conversely increasing the level of dispersed phase might have an impact. The general concept is to drive the solids up by removing water or continuous phase volume of the polyvinyl alcohol based vinyl acetate-ethylene copolymer emulsions.

Theories on polyvinyl alcohol stabilization rest with steric stabilization via acetyl interactions. Therefore, to obtain optimum stabilization at a given solids one would predict that increasing polyvinyl alcohol molecular weight would enhance steric factors and thus overall latex stability.

Prior act regarding vinyl acetate-ethylene copolymer emulsions prepared in the presence of polyvinyl alcohol includes the following:

U.S. Pat. No. 3,661,696 discloses a process for the production of an aqueous emulsion of an ethylene-vinyl acetate copolymer wherein the polymerization is performed in the presence of a preformed seed emulsion and a minor amount, from 1.5 to 6 wt%, of a protective colloid comprising a mixture of fully and partially hydrolyzed polyvinyl acetate. The resulting emulsion can be used as an adhesive. In Example 9 several emulsion compositions were prepared using a low molecular weight polyvinyl alcohol mixture in combination with a nonionic surfactant. In U.S. Pat. Nos. 3,734,819 and 3,769,151 a similar process is disclosed in which the ethylene-vinyl acetate polymer is prepared in the presence also of a small amount of a vinyl sulfonic acid comonomer or an unsaturated $C_3-C_6$ acid, respectively. Similarly, these patent show emulsion compositions prepared using a seed emulsion, the polyvinyl alcohol mixture and a nonionic surfactant.

U.S. Pat. No. 3,692,723 discloses aqueous dispersions and heat melting adhesives comprising same, which dispersions contain a copolymer of ethylene and vinyl acetate wherein the ethylene content is from 30 to 98 wt%, the copolymer having been prepared by a copolymerization process utilizing a particular combination of nonionic emulsifier, anionic enulsifier and protective colloid.

U.S. Pat. No. 3,816,362 discloses a process for preparing a stable aqueous ethylene-vinyl ester copolymer emulsion having an ethylene content of 4 to 20 wt%. Example 1 shows the use of a polyvinyl alcohol, a polyoxyethylene nonylphenyl ether (nonionic surfactant) and sodium dodecyl benzene sulfonate (anionic surfactant).

U.S. Pat. No. 3,827,996 discloses aqueous dispersions of vinyl ester polymers containing as a protective colloid partially hydrolyzed polyvinyl alcohol having an average vinyl acetate content of 5 to 7 mole%. The polyvinyl alcohol may consist of a blend of two or more polyvinyl alcohols, each of which has an average vinyl acetate content different from the average of the blend. Several examples show the use of a partially hydrolyzed and a fully hydrolyzed polyvinyl alcohol in combination with a nonionic surfactant in the preparation of vinyl acetate-ethylene copolymer emulsions.

U.S. Pat. No. 4,043,961 discloses adhesive compositions consisting essentially of an aqueous emulsion of vinyl acetate-ethylene copolymer prepared in the presence of protective colloid comprising fully hydrolyzed vinyl alcohol copolymer containing methyl methacrylate. The examples show the use of such vinyl alcohol copolymer in combination with a medium and/or low viscosity partially hydrolyzed polyvinyl alcohol and a nonionic surfactant.

U.S. Pat. Nos. 4,267,090 and 4,287,329 disclose the preparation of vinyl acetate-ethylene copolymer emulsions in a reaction medium containing a protective colloid and a surface active agent.

U.S. Pat. No. 4,521,561 discloses a vinyl acetate-ehtylene copolymer emulsion exhibiting both partially- and fully-hydrolyzed polyvinyl alcohol compatibility prepared in the presence of a polyvinyl alcohol stabilizing system having an 8–10 mole% residual vinyl acetate content. Since the degree of polymerization of the polyvinyl alcohol affects the viscosity of the emulsion product and is not critical to the invention, polyvinyl alcohols having a degree of polymerization ranging from 200 to 2000 are suitable for use in the invention. In addition to the polyvinyl alcohol stabilizing system, emulsifying agents and protective colloids well known in the polymerization art may also be added in low levels, for example to enhance stability, mentioning polyoxyalkylene condensates.

SUMMARY OF THE INVENTION

The present invention provides stable aqueous dispersions of vinyl acetate-ethylene copolymers of high solids, i.e. greater than 60 wt% solids, which are useful as packaging adhesives and demonstrate surprisingly good speed of set at such high solids level. The aqueous emulsion comprises a vinyl acetate-ethylene copolymer which is 60-95 wt% vinyl acetate and 5-40 wt% ethylene. The copolymer is dispersed in an aqueous medium and prepared by the emulsion copolymerization of the vinyl acetate and ethylene monomers in the presence of a stabilizing system consisting essentially of (1) a low molecular weight polyvinyl alcohol which is 75–99+ mole% hydrolyzed and has an average degree of polymerization ranging from 100–600 and (2) a surfactant. The resulting copolymer emulsions will comprise about 65 to about 70 wt% solids with a viscosity of less than about 3500 cps, preferably less than about 2500 cps at 65% solids and at 60 rpm and 25° C.

The use of a stabilizing system consisting essentially of a low molecular weight polyvinyl alcohol and a surfactant during the emulsion polymerization of vinyl acetate with ethylene provides the following advantages:

Increased polymer solids at viscosities comparable to lower solids emulsions, a lower dibutyl phthalate thickening ratio and lower product surface tensions than vinyl acetate-ethylene copolymer emulsions stabilized solely with polyvinyl alcohol.

By increasing the copolymer solids of the dispersed phase and simultaneously lowering the surface tension of the continuous aqueous phase, intraparticle coalescence (bonding) is enhanced or accelerated. Increased copolymer solids increases particle crowding while lower continuous phase surface tension accelerates the wicking of the continuous phase into porous or semiporous substrates. Both factors accelerate bond formation and adhesive setting speed.

Organic solvents and/or plasticizers like dibutyl phthalate are added to adhesive copolymer emulsions to obtain a thickening response and accelerate the setting speed as is well known in the art. It is also known that too high a compound viscosity can slow wicking of the water into the substrate and thereby produce an opposite effect, i.e. a slower setting speed. The present invention lowers the response at a given additive level while maintaining or improving the speed of set at increased solids content.

Thus by increasing the solids content of the emulsion adhesive while lowering both surface tension and solvent thickening ratio, intraparticle coalescence and substrate bonding are improved.

In addition, the use of the stabilizing system according to the invention results in a product having improved water resistance as well as significantly reducing the reactor cycle time required to produce such high solids emulsion.

The products of this invention result in less grain raising when used as a laminate adhesive to adhere a vinyl substrate to a cellulosic substrate. Prior to this invention water-based adhesives could not be used as an adhesive to laminate such substrates.

DETAILED DESCRIPTION OF THE INVENTION

The copolymers according to the invention comprise 60–95 wt% vinyl acetate and 5–40 wt% ethylene to provide a Tg ranging from about −30° to 20° C., preferably the copolymer contains 75–80 wt% vinyl acetate and 20–25 wt% ethylene on a monomer basis.

The vinyl acetate-ethylene copolymers may optionally include one or more additional ethylenically unsaturated copolymerizable monomers. Exemplary of such comonomers, which may be present at up to 10 wt% or more, are $C_3$–$C_{10}$ alkenoic acids, such as acrylic acid, methacrylic acid, crotonic acid and isocrotonic acid and their esters with $C_1$–$C_{18}$ alkanols, such as methanol, ethanol, propanol, butanol, and 2-ethylhexanol; vinyl halides such as vinyl chlorides; alpha,beta-unsaturated $C_4$–$C_{10}$ alkenedioic acids such as maleic acid, fumaric acid and itaconic acid and their monoesters and diesters with the same $C_1$–$C_{18}$ alkanols; and nitrogen containing monoolefinically unsaturated monomers, particularly nitriles, amides, N-methylol amides, lower alkanoic acid esters of N-methylol amides, lower alkyl ethers of N-methylol amides and allylcarbamates, such as acrylonitrile, acrylamide, methacrylamide, N-methylol acrylamide, N-methylol methacrylamide, N-methylol allylcarbamate, and lower alkyl ethers or lower alkanoic acid esters of N-methylol acrylamide, N-methylol methacrylamide and N-methylol allylcarbamate. If such additional ethylenically unsaturated comonomer is used, about 2–5 wt% is preferred.

Contemplated as the functional, or operative equivalents of vinyl acetate in the copolymer emulsions are vinyl esters of $C_1$–$C_{18}$ alkanoic acids, such as vinyl formate, vinyl propionate, vinyl laurate and the like.

The stabilizing system for the copolymerization reaction to prepare the copolymer emulsion adhesives of the invention consists essentially of 2–4 wt% of a low molecular weight polyvinyl alcohol and 1–4 wt% of a surfactant, based on vinyl acetate monomer. The low molecular weight polyvinyl alcohol which is used in the stabilizing system can be 75–99+ mole% hydrolyzed, preferably 85–90 and especially 87–89 mole% hydrolyzed when used in conjunction with a fully hydrolyzed polyvinyl alcohol, and has a degree of polymerization ranging from 100 to 600, preferably, 185–255. Another means for assessing the degree of polymerization of the polyvinyl alcohol is its viscosity as a 4 wt% aqueous solution at 20° C. Suitable polyvinyl alcohols would have a viscosity ranging from 2.4 to about 7. Such polyvinyl alcohols can be prepared by synthesis and saponification techniques well known to those skilled in the art of manufacturing polyvinyl alcohol. A preferred polyvinyl alcohol having a degree of polymerization of about 235 is marketed by Air Products and Chemicals, Inc. under the trademark VINOL® 203.

The amount of such polyvinyl alcohol stabilizing component used in the polymerization reaction is about 2–4 wt%, preferably about 3 wt%, based on vinyl acetate monomer in the polymerization recipe. The polyvinyl alcohol is added to the polymerization reaction medium all at once prior to initiation or incrementally during the course of the polymerization, provided a sufficient amount is present initially to provide emulsion stability.

In addition to the polyvinyl alcohol component the stabilizer system according to the invention also contains a surfactant at a level of about 1–4 wt%, preferably 2–3 wt%, based on vinyl acetate monomer.

The surfactants contemplated by the invention include any of the known and conventional surfactants and emulsifying agents, principally the nonionic and anionic materials, heretofore employed in the emulsion copolymerization of vinyl acetate and ethylene, the nonionic polyalkoxylated surfactants being especially preferred. Among the nonionic surfactants which have been found to provide good results are included the Igepal surfactants marketed by GAF and the Pluronic surfactants marketed by BASF Wyandotte. The Igepal surfactants are members of a series of alkylphenoxy poly(etyleneoxy)ethanols which can be represented by the general formula $$RPhO-(CH_2CH_2O)_{n-1}-CH_2CH_2OH$$

wherein R represents an alkyl radical and n represents the number of moles of ethylene oxide employed. Illustrative are alkylphenoxy poly(ethyleneoxy)ethanols having alkyl groups containing from about 7-18 carbon atoms, inclusive, and having from about 4 to about 100 ethyleneoxy units, such as the octylphenoxy poly(ethyleneoxy)ethanols, nonylphenoxy poly(ethyleneoxy)ethanols and dodecylphenoxy poly(ethyleneoxy)ethanols; a sodium or ammonium salt of a sulfate ester of these alkylphenoxy poly(ethyleneoxy)ethanols; alkyl poly(ethyleneoxy)ethanols; alkyl poly(propyleneoxy)ethanols. The Pluronic surfactants are condensates of ethylene oxide with a hydrophobic base formed by condensing propylene oxide with propylene glycol, and the like. Suitable nonionic surfactants also include polyoxyalkylene derivatives of hexitol (including sorbitans, sorbides, mannitans and mannides) anhydride, partial long-chain fatty acid esters, such as the polyoxyalkylene derivatives of sorbitan monolaurate, sorbitan monopalmitate, sorbitan monostearate, sorbitan tristearate, sorbitan monooleate and sorbitan trioleate. Other suitable nonionic surfactants which can be employed are alkylene oxide derivatives of long chained fatty alcohols such as octyl, dodecyl, lauryl or cetyl alcohol and polyethoxylated derivatives of acetylenic alcohols which are marketed under the trademark "Surfynol" by Air Products and Chemicals, Inc.

Various free-radical forming sources can be used in carrying out the polymerization of the monomers, such as peroxide compounds. Combination-type systems employing both reducing agents and oxidizing agents can also be used, i.e. a redox system. Suitable reducing agents, or activators, include bisulfites, sulfoxylates, or other compounds having reducing properties such as ascorbic acid, erythorbic acid and other reducing sugars. The oxidizing agents include hydrogen peroxide, organic peroxide such as t-butyl hydroperoxide and the like, persulfates, such as ammonium or potassium persulfate, and the like. Specific redox systems which can be used include hydrogen peroxide and zinc formaldehyde sulfoxylate; hydrogen peroxide and erythorbic acid; hydrogen peroxide, ammonium persulfate or potassium persulfate with sodium metabisulfite, sodium bisulfite, ferrous sulfate, zinc formaldehyde sulfoxylate or sodium formaldehyde sulfoxylate. Other free radical forming systems that are known in the art can also be used to polymerize the monomers.

The oxidizing agent is generally employed in an amount of 0.01-1%, preferably 0.05-0.5%, based on the weight of the vinyl acetate introduced into the polymerization system. The reducing agent is ordinarily added in an aqueous solution in the necessary equivalent amount.

In general, suitable vinyl acetate-ethylene copolymer emulsions can be prepared by the copolymerization of the monomers in the presence of the polyvinyl alcohol-surfactant stabilizing system in an aqueoys medium under pressures up to about 100 atm and in the presence of a redox system which is added incrementally, the aqueous system being maintained by a suitable buffering agent at a pH of about 2-6. The process first involves the homogenization in which the vinyl acetate suspended in water is thoroughly agitated in th presence of ethylene under the working pressure to effect solution of the ethylene in the vinyl acetate while the reaction medium is gradually heated to polymerization temperature. The homogenization period is followed by a polymerization period during which the redox system is added incrementally.

The reaction temperature can be controlled by the rate of redox addition and the rate of heat dissipation. Generally, it is advantageous to maintain a mean temperature of about 55° C. during the polymerization of the monomers and to avoid temperatures much in excess of 80° C. While temperatures as low as zero degrees can be used, economically the lower temperature limit is about 30° C.

The reaction time will depend upom the variables such as the temperature, the free radical forming source and the desired extent of polymerization. It is generally desirable to continue with the reaction until less than 0.5% of the vinyl acetate remains unreacted. While the reaction time of the polymerization process will vary as mentioned above the use of the stabilizing system according to the invention not only provides a high solids vinyl acetate-ethylene copolymer emulsion but also provides the emulsion is a surprisingly shorter reaction time, i.e. the polymerization reactor cycle time is significantly decreased.

In carrying out the polymerization, an amount of the vinyl acetate is initially charged to the polymerization vessek and saturated with ethylene. Most advantageously, at least about 50% of the total vinyl acetate to be polymerized is initially charged and the remainder of the vinyl acetate is added incrementally during the course of the polymerization. The charging of all the vinyl acetate initially is also contemplated with no additional incremental supply.

When reference is made to incremental addition, substantially uniform additions, both with respect to quantity and time, are contemplated. Such additions can be continuous or discontinuous and are also referred to as "delay" additions.

The quantity of ethylene entering into the copolymer is influenced by pressure the agitation and viscosity of the polymerization medium. Thus, to increase the ethylene content of the copolymer, high pressures, greater agitation and a low viscosity are employed.

The process of forming the vinyl acetate-ethylene copolymer emulsion generally comprises the preparation of an aqueous solution containing the stabilizing system and, optionally, the pH buffering system. This aqueous solution and the initial or total charge of the vinyl acetate are added to the polymerization vessel and ethylene pressure is applied to the desired value. The pressurized ethylene source can be shut off from the reactor so that the ethylene pressure decays as it is polymerized or it can be kept open to maintain the ethylene pressure throughout the reaction, i.e. make-up ethylene. As previously mentioned, the mixture was thoroughly agitated to dissolve ethylene in the vinyl acetate and in the water phase. Conveniently, the charge is brought to polymerization temperature during this agitation period. The polymerization is then initiated by introducing initial amounts of the oxidant, the reductant having been added with the initial charge. After polymerization has started, the oxidant and reductant are incrementally added as required to continue polymerization. Any third copolymerizable monomer and the remaining vinyl acetate, if any, may be added as separate delays.

As mentioned, the reaction is generally continued until the residual vinyl acetate content is below about 0.5%. The completed reaction product is then allowed to cool to about room temperature while sealed from the atmosphere. The pH is then suitable adjusted to a value in the range of 4.5 to 7, 4.5 to 5, to insure maximum stability.

A preferred method for producing the vinyl acetate-ethylene copolymer emulsions is a "cold initiation" process which comprises first forming an aqueous emulsion vinyl acetate and the stabilizing system in the reactor. The reactor is then pressurized with ethylene to an ethylene-equilibrium pressure of about 200–500 psig. The resulting reaction mixture is adjusted to a temperature from about 10°–30° C. Polymerization is initiated by the addition of a free radical source at a rate such that the reaction mixture is brought to a temperature of 45°–85° C., preferably 55°–65° C., within a period of one hour or less, preferably 30 minutes. The polymerization is continued at this higher temperature range until the vinyl acetate content is below about 0.5 wt%.

Vinyl acetate-ethylene copolymer emulsions can be directly produced having a solids content of about 65–70% and a viscosity of less than about 3500 cps, preferably less than about 2500 cps and most desirably less than about 1500 cps, at 65% solids and at 60 rpm and 25° C. It is not necessary to employ seed emulsion polymerization techniques to obtain the emulsions of the invention. Seed emulsion polymerization may be detrimental to the properties of the adhesive emulsion product.

Historically, in the preparation of polyvinyl alcohol-stabilized vinyl acetate-ethylene copolymer emulsions 5 wt% polyvinyl alcohol, based on vinyl acetate monomer, was used. In addition, blends of low and medium molecular weight polyvinyl alcohols were used at such levels. In an attempt to increase the solids content of the emulsions in preliminary work leading to the present invention the amount of polyvinyl alcohol was reduced to the 2.5–4 wt% range while using solely a low molecular weight polyvinyl alcohol, namely VINOL ® 205 polyvinyl alcohol having a degree of polymerization of about 550 and a viscosity of 4–6 cps a 4% aqueous solution. Such change in the stabilizing system raised product solids from the historical 50–55 wt% level to about 60%. Measurement of performance parameters compared to a typical prior art emulsion revealed increases in PVC adhesion and slower setting speed, while most of the remaining measured properties were unchanged (see Table 2). While viscosity reduction was obtained by polyvinyl alcohol reduction, the products suffered from poor storage stability.

Attempts to push the solids content to 65% at the 4% polyvinyl alcohol level proved difficult. Processing cycles had to be extended and final viscosities remained high, generally about 3000 cps. Even at the 3% polyvinyl alcohol level product solids did not respond to water removal, that is to say solids did not rise to calculated levels and processing viscosities were high. Generally, when sufficient water was removed to approach 65% solids, product viscosities were to high to be measured. The date in Table 1 demonstrates this.

TABLE 1

| RUN | % SOLIDS TARGET | % PVOH | % SOLID ACHIEVED | VISCOSITY 60 rpm |
|---|---|---|---|---|
| 1 | 60 | 4 | 61.2 | 4,460 |
| 2 | 65 | 4 | 64.8 | off-scale |
| 3 | 60 | 3 | 61.8 | 3,100 |
| 4 | 65 | 3 | 62.7 | 2,870 |

Thus lowering the polyvinyl alcohol levels 40% below the historical level of 5% based on vinyl acetate monomer and using 100% of low molecular weight stabilizer did not produce satisfactory products at 65% solids.

To achieve the solids target of 65%, polyvinyl alcohol levels had to be reduced below 3% and the molecular weight of the polyvinyl alcohol utilized was also reduced. Emulsions were prepared using 100% of a low molecular weight polymer having a degree of polymerization about 235 (VINOL ® 203 polyvinyl alcohol) or blends of VINOL ® 203 polyvinyl alcohol with VINOL ® 205 polyvinyl alcohol. To maintain a minimum polyvinyl alcohol level of 3% a 60/40 blend of V-203/V-205 polyvinyl alcohols was trialed. Product viscosities generally fell into the 2000 cps range after adjusting solids to 62.5%. As can be seen in Table 2 performance testing of these products showed some improvement in PVC adhesion but setting speeds were only marginally improved compared to Run 6 using solely Vinol 205 polyvinyl alcohol. Also emulsion shelf stability was observed to be poor. After several weeks all three of the products listed in Table 2 show signs of severe sludging on storage. Emulsion A is a prior art vinyl acetate-ethylene copolymer emulsion.

TABLE 2

| RUN | A | 5 | 6 | 7 |
|---|---|---|---|---|
| Process Type: | Batch | Batch | 50% Delay | 25% Delay* |
| % PVOH | 5.0 | 3.0 | 4.0 | 3.0 |
| % PVOH Grades | V-205/V-523 | V-203/V-205 | V-205 | V-203/V-205 |
| % Solids | 55.8 | 62.4 | 60.2 | 62.6 |
| Viscosity 60 rpm | 1,440 | 1,560 | 3,940 | 1,840 |
| Index | 2.0 | 1.3 | 1.9 | 1.4 |
| PVC/C Peel | 2.9 | 4.5 | 5.0 | 4.1 |
| Cloth/Cloth Peel | | | | |
| Dry | 15.5 | 10.8 | 13.4 | 9.6 |
| Wet | 1.4 | 3.4 | 1.6 | 3.1 |
| Speed-of-Set, Sec. | 9–12 | 18–21 | 21–24 | 18–21 |
| Creep Rate, mm/min. | 0.012 | 0.039 | 0.004 | 0.006 |
| Thickening Ratio | 5.1 | 18.3 | 13.0 | 20.0 |

*Cold Initiation

EXAMPLE 1

The following is a general procedure for preparing the vinyl acetate-ethylene copolymer emulsions of the invention.

The components of the initial reactor charge and the various delay feeds were as follows:

| INITIAL REACTOR CHARGE | |
|---|---|
| (1) Vinol 203[a], 10% aqueous soln. | 333 gms |
| (2) Vinol 205[a], 10% aqueous soln. | 222 gms |
| (3) Water (deionized) | 437 gms |
| (4) Ferrous ammonium sulfate, 1% aqueous soln. | 5 mls |
| (5) Zinc formaldehyde sulfoxylate, 10% aqueous soln. | 10 mls |
| (6) Igepal CO-887[b] surfactant | 52.8 gms |
| (7) Vinyl acetate | 1387.5 gms |
| (8) Acetic acid | 3.2 gms |
| (9) Ethylene - Quantity to equilibrate reactor to 550 psi at 25° C. | |
| DELAY FEEDS | |
| (1) Hydrogen peroxide, 0.6% aqueous soln. | 177 mls |
| (2) Hydrogen peroxide, 7.0% aqueous soln. | 58 mls |
| (3) Zinc formaldehyde sulfoxylate, 10% aqueous soln. | 48 mls |
| (4) Vinyl acetate | 462.5 mls |

[a]Polyvinyl alcohols marketed by Air Products and Chemicals, Inc. See Table 4.
[b]Nonylphenoxy poly(ethyleneoxy)ethanol marketed by GAF Corp. 70% aqueous solution of Igepal CO-880 surfactant.

The pH of combined polyvinyl alcohol solutions and the deionized water were adjusted to 4 with the acetic acid. Next the surfactant was fully dissolved in the pH adjusted polyvinyl alcohol solution to which the ferrous ammonium sulfate solution was then added.

A one gallon reactor was filled with the water, purged with nitrogen and the polyvinyl alcohol solution was then added. With the solution being agitated at 200 rpm the vinyl acetate monomer initial charge was added. The reactor was purged twice with nitrogen (30 psi) followed by one ethylene purge (30 psi) at 25° C. The agitator speed was increased to 900 rpm and the reactor was pressurized to 550 psi with ethylene (subsurface). The reactor temperature and the ethylene pressure were allowed to equilibrate at 25° C. and 550 psi, respectively. The ethylene supply was shut off to the reactor.

The 10% aqueous zinc formaldehyde sulfoxylate was added to the reactor. The reaction was initiated using the 0.6% aqueous hydrogen peroxide solution at a rate of 0.3 ml/min. After the reactor temperature increased 1° C. (initiation), the vinyl acetate monomer delay was started at 3.3 ml/min. Once the initial temperature rise started to level off, the reaction temperature was ramped from 25° C. to 55° C. after one hour by slowly increasing the rate of addition of the 0.6% hydrogen peroxide solution to achieve 0.8 ml/min addition rate at the one hour mark. The ethylene make-up pressure was then set to 350 psi, the 10% zinc formaldehyde sulfoxylate delay addition was commenced at 0.4 ml/min and the 0.6% hydrogen peroxide solution was automatically controlled to provide a set point 20° C. ΔT ("T reaction-°T jacket). After 3 hours the agitation was increased to 1000 rpm, the vinyl acetate monomer and zinc formaldehyde sulfoxylate additions were stopped.

When the vinyl acetate free monomer level was less than about 3%, the 0.6% hydrogen peroxide delay was stopped and the 7% hydrogen peroxide delay was begun increasing from 0.5 to 1 ml/min over a period of 5-10 minutes. The ethylene make-up was also stopped at this time. When the 7% hydrogen peroxide delay addition was complete, the free monomer content was measured and when less than 0.7% the reaction medium was cooled to 30° C. and adjusted to pH 5 with 14% ammonium hydroxide solution. The reaction mixture was then transferred to a degasser to vent off any excess ethylene pressure. Colloid 585 was then added to the degassing vessel followed by the following materials dissolved in deionized water (25 g):

t-butyl hydroperoxide: 2.5 g
sodium acetate: 3.2 g
sodium citrate: 1.6 g

The above was added at a rate of 1 ml/min while the contents were agitated in the degasser at 200 rpm and then filtered.

The emulsion product (Run 8) had the following properties in comparison to another prior art vinyl acetate-ethylene copolymer Emulsion A:

| PRODUCT PROPERTIES | | Run 8 | Emulsion A |
|---|---|---|---|
| A. | Colloidal Properties | | |
| | Solid, % | 64.4% | 55.2 |
| | Viscosity, 12 rpm | 2300 | |
| | Viscosity, 20 rpm | 1630 | |
| | Viscosity, 60 rpm | 1160 | 2150 |
| | Surface Tension, dynes/cm$^2$ | 44.7 | 50+ |
| | Particle Size$^{(1)}$ | | |
| | DW, microns | 0.86 | |
| | DN, microns | 0.39 | |
| | Polydispersity | 2.23 | |
| B. | Copolymer Properties | | |
| | Tg, °C. | −7.5 | |
| | Toluene Insolubles, % | 43.4 | |
| C. | Adhesive Performance Values | | |
| | PVC/Cloth Peel, lbs | 3.6 | |
| | Creep Resistance, mm/min. | 0.150 | |
| | Speed of set, sec | 3-6 | 9-12 |
| | Cloth/Cloth, lbs | | |
| | Dry | 11.5 | |
| | Wet | 3.4 | |
| | Thickening Ratio | 3.6 | 6.1 |

$^{(1)}$method of measurement - disc centrifuge

The use of a surfactant in combination with a low molecular weight polyvinyl alcohol as a stabilizing system during the polymerization of vinyl acetate with ethylene afford the following advantages compared to the prior art vinyl acetate-ethylene copolymer emulsion ("A") prepared in the presence of a stabilizing system comprising solely a blend of Vinol ® 205 and Vinol ® 523 polyvinyl alcohols:

Increased polymer solids at viscosities comparable to lower solids products,

Increased polymer solids yielding lower plasticizer thickening ratio, and

Increased polymer solids and lower product surface tensions.

EXAMPLE 2

This example demonstrates that the addition of a nonionic surfactant (Igepal CO-880, 2% based on vinyl acetate monomer) to the polyvinyl alcohol stabilizing system in the preparation of a vinyl acetate-ethylene copolymer emulsion recipe affords a higher solids loading with no accompanying viscosity Zor reaction time increases and represents an approximate 18% increase in vinyl acetate monomer conversion/reactor power. The preparation procedure was similar to that of Example 1 except that all the vinyl acetate monomer was batched into the reactor prior to initiation. All runs contained 4.87% total stabilizer. Runs containing no surfactant were stabilized with 4.8% polyvinyl alcohol (65/35 of Vinol ® 205 PVOH/Vinol ® 523 PVOH). Co-stabilized runs contained 2.87% polyvinyl alcohol (65/35 of Vinol ® 205 PVOH/Vinol ® 523 PVOH) and 2% Igepal CO-880 surfactant.

TABLE 3

| | Emulsion A 55% Solids No Surf. | Run 9 60% Solids$^1$ No Surf. | Run 10 60% Solids$^1$ 2% Surf. | Run 11 62% Solids,$^2$ 2% Surf. |
|---|---|---|---|---|
| Solids, % | 55 | COAGULATE | 60 | 62 |
| Viscosity, cps | 820 | | 800 | 1900 |
| Rxn Time, hrs. | 3.1 | | 2.4 | 2.9 |
| Avg. VAM Conv., gms/hr. | 550 | | 600 | 650 |
| Speed of Set, sec. | 9-12 | | 9 | 9 |

TABLE 3-continued

| | Emulsion A 55% Solids No Surf. | Run 9 60% Solids[1] No Surf. | Run 10 60% Solids[1] 2% Surf. | Run 11 62% Solids,[2] 2% Surf. |
|---|---|---|---|---|
| | | | D | |

[1]Target was 60% solids.
[2]Target was 65% solids.

It can be seen from Table 3 that addition of a surfactant to a polyvinyl alcohol stabilizing system permited the preparation of a higher solids content emulsion in a shorter reaction time. It should be noted that a solids level of 65% was not attained using the low molecular weight Vinol ® 205 PVOH in combination with a substantial amount of medium molecular weight Vinol ® 523 PVOH.

EXAMPLE 3

This example demonstrates that partially and fully hydrolyzed low molecular weight polyvinyl alcohols afford high solids (65%) emulsions with no adverse processing effects. Runs 12-32 were prepared following the delay process of Example 1. With the exception of the Emulsion A control and Run 12, all the runs contain 2% Igepal CO-880, based on vinyl acetate monomer. The final emulsions of Runs 12-32 were roughly 65% solids. Emulsion A was 55% solids.

The results of Table 4 indicate that the optimum total polyvinyl alcohol level is between 2 and 3%, based on vinyl acetate monomer. Even at these levels, the use of greater than 2% of the low molecular weight Vinol ® 107 and Vinol ® 205 polyvinyl alcohols generally resulted in slightly higher viscosities and slower setting speeds while the addition of as little as 0.6% of the medium molecular weight Vinol ® 523 polyvinyl alcohol yielded extremely high viscosities. Accordingly, the preferred low molecular weight polyvinyl alcohol for use in the invention is Vinol ® 203 polyvinyl alcohol which has an even lower molecular weight than that of Vinol ® 107 or Vinol ® 205 polyvinyl alcohols. Vinol 203 polyvinyl alcohol afforded superior water resistance.

EXAMPLE 4

In this example various anionic and nonionic surfactants were tested as the surfactant component of the stabilizing system of the invention. With the exception of the Emulsion A control, all the runs were prepared in the presence of 3% polyvinyl alcohol (60/40 of Vinol ® 203 PVOH/Vinol ® 205 PVOH) in addition to the specified surfactant. Final emulsions were roughly 65% (Emulsion A was 55%). The delay emulsion procedure according to Example 1 was followed. See Table 5.

TABLE 4

| | PVOH Grade/Level (Wt % based on VAM) | | | | | Processing | | Adhesion Performance | | | |
|---|---|---|---|---|---|---|---|---|---|---|---|
| | | | | | | Visc., | Rnx Time, | Speed of | Cloth/Cloth, lbs. | | |
| RUN | TOTAL | V-203 | V-107 | V-205 | V-523 | cps | hrs. | Set. sec. | Dry | Wet | % Rt |
| A | 4.87 | — | — | 3.17 | 1.70 | 820 | 3.1 | 9-12 | 13.5 | 1.3 | 9.6 |
| 12 | 3 | 1.8 | — | 1.2 | — | 4100 | 7.8 | 18 | 13.1 | 2.5 | 19.1 |
| 13 | 2 | 0.8 | 1.2 | — | — | 1520 | 3.0 | — | — | — | — |
| 14 | 2 | — | 1.2 | 0.8 | — | 1220 | 3.5 | — | — | — | — |
| 15 | 2 | — | 1.2 | — | 0.8 | 8340 | 4.5 | 9-12 | 9.9 | 3.3 | 32.8 |
| 16 | 2 | 1.2 | — | 0.8 | — | 1290 | 3.7 | 9 | 10.3 | 3.0 | 29.1 |
| 17 | 3 | 2.4 | 0.6 | — | — | 1330 | 3.2 | 6-9 | 12.5 | 2.3 | 18.4 |
| 18 | 3 | 1.2 | 1.8 | — | — | 1700 | 3.1 | — | — | — | — |
| 19 | 3 | 0.6 | 2.4 | — | — | 1530 | 3.2 | 9 | 11.7 | 2.5 | 21.4 |
| 20 | 3 | — | 0.6 | 2.4 | — | 2660 | 3.8 | 9 | 12.1 | 2.1 | 17.4 |
| 21 | 3 | — | 1.8 | 1.2 | — | 2700 | 3.1 | — | — | — | — |
| 22 | 3 | — | 2.4 | 0.6 | — | 2370 | 3.2 | — | — | — | — |
| 23 | 3 | — | 0.6 | — | 2.4 | >10K | 6.1 | 6-9 | 12.3 | 2.0 | 16.5 |
| 24 | 3 | — | 1.8 | — | 1.2 | 6700 | 4.1 | 9-12 | 12.1 | 2.8 | 22.9 |
| 25 | 3 | — | 2.4 | — | 0.6 | 7080 | 4.0 | 9-12 | 12.1 | 2.3 | 18.4 |
| 26 | 3 | 0.6 | — | 2.4 | — | 3750 | 4.0 | — | — | — | — |
| 27 | 3 | 1.8 | — | 1.2 | — | 1160 | 3.5 | 3-6 | 11.5 | 3.4 | 29.6 |
| 28 | 3 | 2.4 | — | 0.6 | — | 1330 | 3.6 | — | — | — | — |
| 29 | 4 | 1.6 | 2.4 | — | — | 1870 | 3.0 | — | — | — | — |
| 30 | 4 | — | 2.4 | 1.6 | — | 2720 | 3.8 | — | — | — | — |
| 31 | 4 | — | 2.4 | — | 1.6 | >10K | 7.0 | 9-12 | 13.7 | 1.6 | 11.3 |
| 32 | 4 | 2.4 | — | 1.6 | — | 2540 | 3.6 | 9 | 13.6 | 2.1 | 15.4 |

| | VINOL 107 | VINOL 203 | VINOL 205 | VINOL 523 |
|---|---|---|---|---|
| Hydrolysis (mole %) | 98-98.8 | 87-89 | 87-89 | 87-89 |
| Viscosity* | 5-7 | 3-4 | 4-6 | 21-25 |
| Mol. Wt. | 17,000 | 12,000 | 25,000 | 60,000 |
| Dp | 400 | 235 | 550 | 1250 |

*4% aq. solution at 20° C.

TABLE 5

| | Surfactant | | | | Processing | | Adhesion Performance | | | |
|---|---|---|---|---|---|---|---|---|---|---|
| | | | EO | | Visc., | Rnx Time, | Speed of | Cloth/Cloth, lbs. | | |
| Run | Type | Level[1] | Chain Length | HLB | cps | hrs. | Set. sec. | Dry | Wet | % Rt |
| A | No Surf. | | | | 1400-2000 | 3.1 | 9-12 | 15.5 | 0.8 | 5.2 |
| 33 | No Surf. | | | | 4100 | 7.8 | 18 | 13.1 | 2.5 | 19.1 |
| | Anionics | | | | | | | | | |
| 34a | DS-10 | 3 | 0 | | 3940 | 3.2 | 12-15 | 13.9 | 0.9 | 6.5 |
| b | | 2 | | | 3590 | 4.1 | | | | |
| c | | 0.5 | | | 4920 | 5.7 | | | | |

TABLE 5-continued

| | Surfactant | | | Processing | | Adhesion Performance | | | |
|---|---|---|---|---|---|---|---|---|---|
| | | EO | | Visc., | Rnx Time, | Speed of | Cloth/Cloth, lbs. | | |
| Run | Type | Level[1] | Chain Length | HLB | cps | hrs. | Set. sec. | Dry | Wet | % Rt |
| 35 | Sipex UB | 2 | 0 | | COAGULATION DURING POLYMERIZATION | | | | | |
| 36 | Alipal CO-433 | 2 | 3 | | 8190 | 4.5 | 9–12 | 12.6 | 2.3 | 18.3 |
| 37a | Aerosol | 3 | 5 | | 3500 | 3.6 | 9–12 | 13.8 | 2.3 | 16.7 |
| b | A-102 | 2 | | | 3690 | 3.9 | | | | |
| c | | 0.5 | | | 6900 | 7.9 | | | | |
| | Nonionics | | | | | | | | | |
| 38 | Igepal CO-530 | 2 | 6 | 10.8 | 1350 | 3.5 | 15 | 9.4 | 2.8 | 29.8 |
| 39 | Igepal CO-630 | 2 | 9 | 13 | 1080 | 3.9 | 9–12 | 12.3 | 2.4 | 19.5 |
| 40 | Igepal CO-880 | 2 | 30 | 17.2 | 1160 | 3.5 | 3–6 | 11.5 | 3.4 | 29.6 |
| 41a | Surfynol | 3 | 30 | 14–17 | 1050 | 3.2 | 9–12 | 12.8 | 2.8 | 22.2 |
| b | 485 | 2 | | | 1380 | 3.0 | | | | |
| c | | 0.5 | | | 4990 | 5.6 | | | | |
| 42a | Pluronic | 3 | 37.5 | 17 | 1660 | 3.3 | 6–9 | 12.0 | 2.1 | 17.5 |
| b | P65 | 2 | | | 1570 | 3.5 | 9 | | | |
| c | | 0.5 | | | 6460 | 6.2 | 15–18 | | | |
| 43 | Igepal CO-990 | 2 | 100 | 19 | 2580 | 3.8 | 9–12 | 12.4 | 2.5 | 20.4 |
| 44 | Pluronic F68 | 2 | 151 | 29 | 2500 | 3.5 | 9 | 10.8 | 2.8 | 25.9 |

[1]Weight Percent Based On VAM.

In general, the nonionic surfactants provided 65% solids content with no adverse processing effects, i.e. less than 2000 cps viscosities, 3–4 hour reaction times and increased vinyl acetate monomer conversion efficiency, and maintained or improved the speed of set compared to Emulsion A (55% solids). Similar speed set results could be obtained for Run 38 if the surfactant level were raised another 1 or 2%. Speed of set improvements are observed for the nonionic polyoxyalkylene derivatives of alkylphenols and propylene glycol containing 30–40 ethylene oxide units.

From the examples it can be seen that the invention provides high solids vinyl acetate-ethylene copolymer emulsions possessing a speed of set of about 12 seconds or less, preferably about 9 seconds or less, and most desirably about 6 seconds or less. The speed of set values are determined by the standard test in TAPPI's Tests of Adhesives. Monograph 35, page 103 using 50% bond and kraft paper.

Both nonionic and anionic surfactants, when mixed with low molecular weight partially hydrolyzed (87–89%) polyvinyl alcohol or mixtures of low molecular weight partially and fully hydolyzed (96–99%) polyvinyl alcohols have marked effect on processing viscosity. This effect in turn is reflected in reduced polymerization cycle time due to polymerization rate enhancement and heat transfer.

STATEMENT OF INDUSTRIAL APPLICATION

The invention provides vinyl acetate-ethylene copolymer emulsions of high solids content and relatively low viscosities for use as adhesive compositions in making laminates, particularly cloth to cloth laminates and vinyls to cellulosic substrates such as wood chip particle board.

We claim:

1. In a vinyl acetate-ethylene copolymer emulsion prepared by the aqueous emulsion copolymerization of vinyl acetate and ethylene monomers in the presence of a polyvinyl alcohol and a surfactant, the improvement which comprises a stable vinyl acetate-ethylene copolymer emulsion, the copolymer containing 60–95 wt% vinyl acetate and 5–40 wt% ethylene, the emulsion being about 65–70% solids, having a viscosity of less than about 3500 cps at 65% solids and prepared by aqueous emulsion copolymerization in the presence of a stabilizing system consisting essentially of 2–4 wt%, based on vinyl acetate monomer, of low molecular weight polyvinyl alcohol which has a 100–600 degree of polymerization and 1–4 wt%, based on vinyl acetate monomer, of a nonionic surfactant which is a polyethoxylated derivative of about 30–40 ethylene oxide units of (a) an alkyl phenol, the alkyl group containing 7–18 carbon atoms, or (b) a hydrophobic base formed by condensing propylene oxide with propylene glycol.

2. The vinyl acetate-ethylene copolymer emulsion of claim 1 in which the viscosity is less than about 2500 cps at 65% solids.

3. The vinyl acetate-ethylene copolymer emulsion of claim 1 in which the polyvinyl alcohol is 75–99+ mole% hydrolyzed.

4. The vinyl acetate-ethylene copolymer emulsion of claim 1 in which the viscosity is less than about 1500 cps at 65% solids.

5. The vinyl acetate-ethylene copolymer emulsion of claim 1 in which the surfactant is an alkylphenoxy poly(ethyleneoxy) ethanol in which the alkyl group is octyl or nonyl.

6. The vinyl acetate-ethylene copolymer emulsion of claim 1 in which the surfactant is a nonylphenoxy poly(ethyleneoxy) ethanol.

7. The vinyl acetate-ethylene copolymer emulsion of claim 6 in which the surfactant contains about 30 ethylene oxide units.

8. The vinyl acetate-ethylene copolymer emulsion of claim 1 in which the low molecular weight polyvinyl alcohol is about 3 wt%, based on vinyl acetate.

9. The vinyl acetate-ethylene copolymer emulsion of claim 8 in which the nonionic surfactant is 2–3 wt%, based on vinyl acetate.

10. The vinyl acetate-ethylene copolymer emulsion of claim 9 in which the surfactant is nonylphenoxy poly(ethyleneoxy) ethanol.

11. The vinyl acetate-ethylene copolymer emulsion of claim 2 in which the polyvinyl alcohol is a mixture of two polyvinyl alcohols having a 100-600 degree of polymerization, one of which has a degree of polymerization in the range of 185-255.

12. The vinyl acetate-ethylene copolymer emulsion of claim 11 in which the surfactant is a nonylphenoxy poly(ethyleneoxy) ethanol.

13. In a vinyl acetate-ethylene copolymer emulsion prepared by the aqueous emulsion copolymerization of vinyl acetate and ethylene monomers in the presence of a polyvinyl alcohol and a surfactant, the improvement which comprises a stable vinyl acetate-ethylene copolymer emulsion of about 65-70% solids having a viscosity of less than about 2500 cps at 65% solids and prepared by aqueous emulsion copolymerization in the presence of a stabilizing system consisting essentially of 2-4 wt%, based on vinyl acetate monomer, low molecular weight 75-99+ mole% hydrolyzed polyvinyl alcohol which has a 100-600 degree of polymerization and 1-4 wt%, based on vinyl acetate monomer, of a nonionic octyl- or nonylphenoxy poly(ethyleneoxy) ethanol surfactant having about 30-40 ethylene oxide units.

14. The vinyl acetate-ethylene copolymer emulsion of claim 13 in which the polyvinyl alcohol comprises a mixture of polyvinyl alcohols which are 85-90 mole% hydrolyzed and have a 100-600 degree of polymerization, one of the polyvinyl alcohols having a degree of polymerization in the range of 185-255.

15. The vinyl acetate-ethylene copolymer emulsion of claim 13 in which the polyvinyl alcohol has a degree of polymerization in the range of 185-255.

16. The vinyl acetate-ethylene copolymer emulsion of claim 14 in which the viscosity is less than about 1500 cps at 65% solids.

17. The vinyl acetate-ethylene copolymer emulsion of claim 14 in which the polyvinyl alcohol component is about 3 wt% and the nonionic surfactant component is about 2-3 wt%.

18. The vinyl acetate-ethylene copolymer emulsion of claim 17 in which the viscosity is less than about 1500 cps and the surfactant is nonylphenoxy poly(ethyleneoxy) ethanol.

19. The vinyl acetate-ethylene copolymer emulsion of claim 18 in which the surfactant contains about 30 ethylene oxide units.

20. A stable vinyl acetate-ethylene copolymer emulsion comprising a stable aqueous colloidal dispersion of a copolymer containing 75-80 wt% vinyl acetate and 20-25 wt% ethylene prepared by the emulsion copolymerization of vinyl acetate and ethylene monomers in the presence of a stabilizing system consisting essentially of 2-4 wt%, based on a vinyl acetate monomer, low molecular weight 75-99+ mole% hydrolyzed polyvinyl alcohol which has a 100-600 degree of polymerization and 1-4 wt%, based on vinyl acetate monomer, of a nonylphenoxy poly(ethyleneoxy) ethanol having about 30-40 ethylene oxide units, the copolymer emulsion being about 65-70% solids and having a viscosity of less than about 1500 cps at 65% solids.

21. The vinyl acetate-ethylene copolymer emulsion of claim 20 in which the polyvinyl alcohol comprises a mixture of polyvinyl alcohols which are 87-89 mole% hydrolyzed and have a 100-600 degree of polymerization, one of the polyvinyl alcohols having a degree of polymerization in the range of 185-255.

22. The vinyl acetate-ethylene copolymer emulsion of claim 20 in which the polyvinyl alcohol has a degree of polymerization in the range of 185-255.

23. The vinyl acetate-ethylene copolymer emulsion of claim 13 in which the polyvinyl alcohol comprises a mixture of a fully hydrolyzed (96-99 mole%) polyvinyl alcohol and a partially hydrolyzed (87-89 mole%) polyvinyl alcohol, the polyvinyl alcohols having a 100-600 degree of polymerization, one of which has a degree of polymerization in the range of 185-255.

24. The vinyl acetate-ethylene copolymer emulsion of claim 23 in which the partially hydrolyzed polyvinyl alcohol has a degree of polymerization in the range of 185-255.

25. The vinyl acetate-ethylene copolymer emulsion of claim 23 in which the emulsion viscosity is less than about 1500 cps and the surfactant is nonylphenoxy poly(ethyleneoxy) ethanol.

26. The vinyl acetate-ethylene copolymer emulsion of claim 25 in which the surfactant contains about 30 ethylene oxide units.

27. The vinyl acetate-ethylene copolymer emulsion of claim 24 in which the viscosity is less than about 1500 cps and the surfactant is a nonylphenoxy poly(ethyleneoxy) ethanol.

28. The vinyl acetate-ethylene copolymer emulsion of claim 27 in which the surfactant contains about 30 ethylene oxide units.

* * * * *